(12) United States Patent
Kasono et al.

(10) Patent No.: US 6,996,043 B2
(45) Date of Patent: Feb. 7, 2006

(54) OPTICAL HEAD APPARATUS

(75) Inventors: Osamu Kasono, Saitama (JP); Yoshiaki Kojima, Saitama (JP); Yasumitsu Wada, Saitama (JP)

(73) Assignee: Pioneer Corporation, Tokyo (JP)

( * ) Notice: Subject to any disclaimer, the term of this patent is extended or adjusted under 35 U.S.C. 154(b) by 115 days.

(21) Appl. No.: 09/813,306

(22) Filed: Mar. 21, 2001

(65) Prior Publication Data

US 2001/0024422 A1  Sep. 27, 2001

(30) Foreign Application Priority Data

Mar. 24, 2000  (JP)  .......................... P. 2000-083500

(51) Int. Cl.
*G11B 7/085* (2006.01)
(52) U.S. Cl. ................. 369/53.14; 369/300; 369/13.13; 369/13.32; 369/53.21
(58) Field of Classification Search ............. 369/53.19, 369/44.32, 300, 44.35, 53.17, 53.41, 53.21, 369/53.14, 13.13, 13.32; 430/945, 321, 320, 430/271.1, 273.1; 359/508, 664; 250/201.5, 250/234, 557, 559.01, 224, 225; 360/294.7; 356/601, 336, 338, 243.4; 256/237.5

See application file for complete search history.

(56) References Cited

U.S. PATENT DOCUMENTS

| | | | | |
|---|---|---|---|---|
| 3,767,306 A | * | 10/1973 | Mast et al. ................. | 356/336 |
| 4,402,607 A | * | 9/1983 | McVay et al. ............... | 356/338 |
| 5,436,464 A | * | 7/1995 | Hayano et al. ........ | 250/559.01 |
| 6,130,418 A | * | 10/2000 | Van Rosmalen et al. | 250/201.5 |
| 6,166,808 A | * | 12/2000 | Greve ......................... | 356/601 |
| 6,178,157 B1 | * | 1/2001 | Berg et al. .................. | 369/300 |
| 6,194,129 B1 | * | 2/2001 | Kasono et al. .............. | 430/320 |

FOREIGN PATENT DOCUMENTS

| EP | 0 549 236 A2 | 6/1993 |
|---|---|---|
| WO | WO 97/39441 | 10/1997 |

* cited by examiner

*Primary Examiner*—William Korzuch
*Assistant Examiner*—Kim-Kwok Chu
(74) *Attorney, Agent, or Firm*—Morgan, Lewis & Bockius LLP

(57) ABSTRACT

Preceding to the reading out of the recording information of the optical disk by the pick-up, the height of the foreign material existing at the light converging position on the information reading surface is detected by the detector, and when the height of the foreign material is higher than the floating height h of the SIL, the magnetic field is generated by applying the control current corresponding to the height of the foreign material to the coil as the magnetic field generator at the timing before the foreign material is moved to the information reading position of the pick-up by the rotation of the optical disk. Then, when the magnetic field is provided to the magnetic substance fixedly holding the SIL which is floating, the movement operation to separate the SIL to the higher position than the height of the foreign material from the information reading surface together with the magnetic substance, is conducted.

7 Claims, 5 Drawing Sheets

OPTICAL HEAD APPARATUS

BACKGROUND OF THE INVENTION

1. Field of the Invention

The present invention relates to an optical head apparatus used for an information reproducing apparatus to reproduce the information from the information recording medium by using a laser light or an information recording apparatus to record the information in the information recording medium.

2. Related Art

An optical head of the information reproducing apparatus to reproduce the recorded information through pits from an optical disk in which the pits to carry the information are formed in the high density, introduces the laser light emitted from a semiconductor laser element as a light source provided in the main body to an objective lens along a predetermined optical path, and a light beam condensed by the objective lens is irradiated onto the information recording surface of the optical disk, and a reflected light which is light modulated by the pit formed on the information recording surface, is introduced to a light receiving element by a predetermined optical path though the objective lens again, and in the light receiving element, by being converted into an electric signal corresponding to a received light amount, the recording information can be read.

In this connection, recently, a consideration of the optical disk in which the information can be recorded in the higher density as compared to the DVD, is conducted. In such the optical disk, because the pit on the information surface is formed smaller than the pit of the DVD, it is necessary that the light beam to read this is also formed to be a smaller spot.

When the numerical aperture of the objective lens is NA, and the wavelength of the light beam is $\lambda$, it is well known that the dimension (diameter) of the light spot is proportional to $\lambda/NA$. Accordingly, the shorter the wavelength of the light beam is, and the larger the numerical aperture NA of the objective lens is, the light spot can be made smaller.

However, from the relationship of thickness of the information recording medium, tilt (inclination) at the time of recording and reproducing or the tolerance value of the depth of focus of the light beam, when the numerical aperture is made so large, because the tolerance width of them becomes narrow, and exceeds the ability of the servo control, as the practical numerical aperture in the present situation, the NA is set to a value of about 0.6.

Accordingly, as a technology to increase the numerical aperture while maintaining the tolerance width, an optical head apparatus using a solid immersion lens (hereinafter, called SIL)is considered.

This is a technology in which the SIL is arranged between an objective lens and an optical disk, and a laser light condensed by the objective lens is irradiated onto the SIL, and after the laser light is further converged by the SIL and focused, it is irradiated onto the information recording surface of the optical lens. That is, the refraction by the SIL is used, and the apparent NA is increased, and a microscopic light spot is formed on the information recording surface of the optical disk.

FIG. 5 is a view showing an example of an optical head apparatus using the SIL. In FIG. 5, in a casing 100 of a pick-up P1, a magnet 101 for the focus control is provided, and a focus coil 102 is provided in the magnetic field generated by the magnet. The focus coil 102 is integrally fixed with a lens holder 104 to hold an objective lens 103. The lens holder 104 is connected to the casing 100 through a support member 105 having the elasticity in the optical axis direction of the objective lens 103, and supported movably in the optical axis direction of the objective lens 103 by the casing 100.

A SIL 106 is a semi-spherical minute lens arranged in such a manner that a flat surface portion is opposed to the information recording surface of the optical disk, and on a slider 107, is fixedly supported so as to be coaxial to the objective lens 103. The slider 107 is elastically supported movably in the optical axis direction of the objective lens by being connected to the lens holder 104 through a support member 108 having the elasticity in the optical axis direction of the objective lens 103.

Further, the pick-up P1 is connected to a carriage 110 of the optical had apparatus through an arm 109. The carriage 110 is a movement mechanism to move the pick-up P1 supported by the arm 109 in the radial direction of the optical disk, and appropriately moves the pick-up P1 in the radial direction of the optical disk through the arm 109.

Further, when the optical disk is under the rotational condition, a thin layer of the air is formed between the disk surface and the SIL 106, and the SIL 106 is floated up with a predetermined distance h of about 100 nm.

FIG. 5 shows the optical head apparatus under the condition that the optical disk is rotated. The optical head apparatus adjusts the position of the objective lens 103 so that the distance in the optical axis direction between the SIL 106 which is currently floating, and the objective lens 103, becomes a predetermined distance by controlling the focus coil 102 by a control section, not shown. Thereby, the SIL 106 and the objective 107 are respectively arranged at appropriate optical positions in the focus direction from the information recording surface, and the laser light can be condensed onto the information recording surface of the optical disk as a minute optical spot.

(Problem that the Invention is to Solve)

As described above, in the optical head apparatus using the SIL 106, when the pick-up P1 reads the recording information from the rotating optical disk, because the distance between the bottom surface portion of the floating SIL 106 and the optical disk surface is kept to a very narrow distance h, for example, when, as shown in FIG. 5, there is a foreign material such as a dust which has the height H larger than this distance h on the disk surface or a protrusion due to the molding failure of the disk surface, the SIL 106 clashes against the foreign material, and in the worst case, there is a possibility that the SIL is damaged.

SUMMARY OF THE INVENTION

In view of the above described problems, the present invention is attained, and the object of the present invention is to provide an optical head apparatus in which, even when there is a foreign material of the height higher than the floating height of the SIL on the optical disk surface, the SIL is not damaged by the foreign material.

(Means for Solving the Problems)

The invention of the first aspect of the present invention is an optical head apparatus, which comprises: on an optical path of a light beam between an objective lens and an information recording medium, an immersion lens to increase a numerical aperture in the light beam; a movement unit for moving the immersion lens in the direction to separate it from the information recording medium corresponding to a control signal; a detector for detecting a foreign material fitted onto the surface of the information recording medium; and a controller for outputting the control signal to separate the immersion lens to the higher position than the height of the foreign material by the movement unit.

According to the invention of the first aspect, the detector detects the height of the foreign material on the information reading surface of the recording medium, and the controller supplies the control signal to separate the immersion lens from the information recording medium by the movement unit to the movement unit corresponding to the detection result. Then, because the movement unit moves the immersion lens according to the supplied control signal in the direction to separate it from the information recording medium, the immersion lens can be prevented from clashing against the foreign material.

Further, the invention of the second aspect is characterized in that, in the optical head apparatus of the first aspect of the present invention, the movement unit has the magnetic field generator for generating the magnetic field of the intensity corresponding to the control signal, and the magnet integrally provided with the immersion lens, and the controller outputs the control signal to make the magnetic field generator generate the magnetic force to separate the immersion lens to the position of the height higher than the height of the foreign material.

According to the invention of the second aspect, when the detector detects the foreign material of the height higher than the floating height h of the immersion lens, because the controller can move the immersion lens to the higher position than the height of the foreign material in the separating direction from the information recording surface by supplying the current to generate the magnetic force corresponding to the height of the foreign material by the magnet integrally provided with the immersion lens to the magnetic field generator, for example, composed of the electromagnet, the immersion lens is not carelessly clashed against the foreign material on the surface of the information recording medium.

Figure 1:
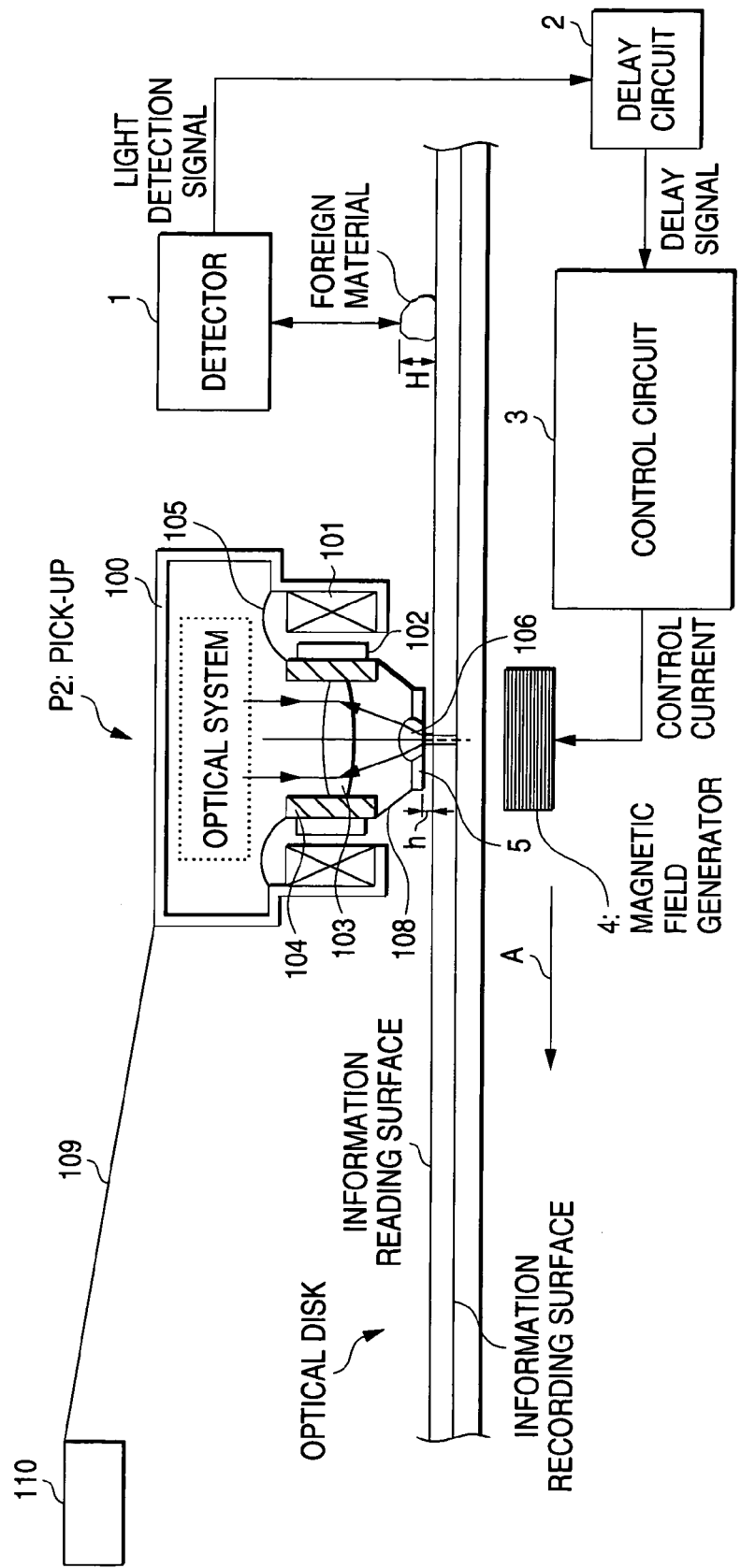
FIG. 1 is a view showing an optical head apparatus in the preferred embodiment of the present invention.

DETAILED DESCRIPTION OF THE PREFERRED EMBODIMENTS (Mode for Carrying Out the Invention)

Next, referring to the drawings, preferred embodiments of the present invention will be described.

FIG. 1 is a view showing an optical head apparatus in the preferred embodiment of the present invention. In this connection, in the structure of each portion of the optical head apparatus shown in FIG. 1, the equivalent portion to each structural portion of the optical head apparatus in FIG. 5 described above, is denoted by the same symbol, and its detailed description is omitted. In FIG. 1, the optical head apparatus is structured being provided with: a pick-up P2; an arm 109 as a support means; a detector 1 for detecting the height of the foreign material on the surface of the optical disk; a delay circuit 2; a control circuit 3 as a controller; and a coil 4 as a magnetic field generator.

Figure 5:
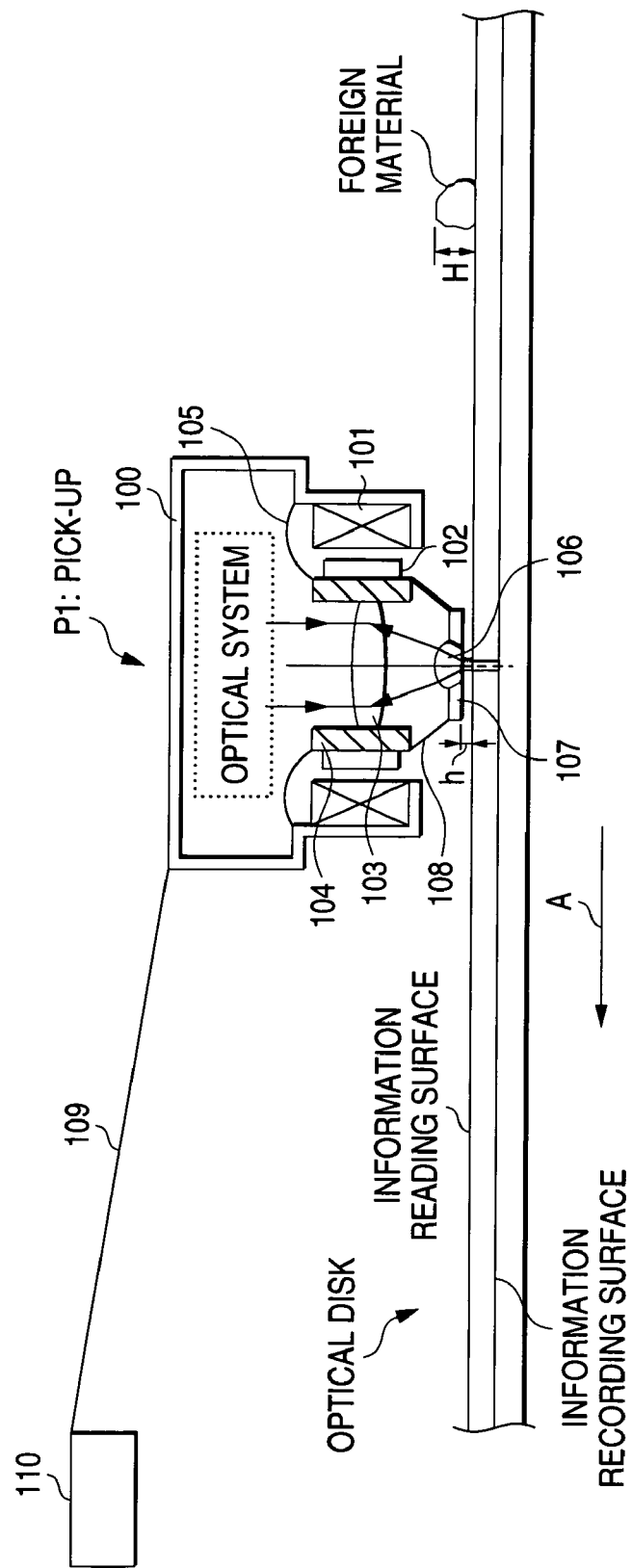
FIG. 5 is a view showing an example of the optical head apparatus using an SIL.

The pick-up P2 is structured in such a manner that a slider 5 composed of a magnetic substance (magnet) such as iron or nickel in which the surface opposed to the coil 4 is magnetized into the magnetism whose direction is the reverse direction to the magnetic field generated by the coil 4, takes the place of the slider 107 shown in the pick-up P1 in FIG. 5. The pick-up P2 is connected to the carriage 110 through the arm 109 in the same manner as the pick-up P1 in FIG. 5.

In this connection, in the present embodiment, the movement unit to move the SIL 106 of the pick-up P2 in the optical axis direction of the objective lens 103 is structured by the slider 5 and the coil 4.

The slider 5 is arranged so that the lower surface side (bottom surface portion) opposed to the surface of the optical disk is one side surface on the magnet pole side of the magnet, and fixedly holds the SIL 106. Further, the slider 5 is, in the same manner as the slider 107 in the pick-up P1, connected to the lens holder 104 through the support member 108, and by the lens holder 104, is elastically supported movably in the optical axis direction of the objective lens.

Further, the coil 4 structures a so-called solenoid type electromagnet on which the copper wire is wound, for example, cylindrically, and as shown in FIG. 1, arranged so that the circular cross section of the solenoid is opposed to the slider 5, just below the slider 5 sandwiching the optical disk, and generates the magnetic field corresponding to the control current supplied from the control circuit 3 which is the controller. Further, the coil 4 is structured in such a manner that the relative position to the casing 100 of the pick-up P2 is fixed by the support member having the high rigidity, not shown, and when the pick-up P2 is moved in the radial direction of the disk by the carriage 110, the pick-up P2 can move together with its casing 100.

The detector 1 is arranged at an upstream position of the pick-up P2 in the rotational direction of the optical disk, that is, at a position at which the condition of the information recording track can be detected preceding to the information reading motion from the information recording track by the pick-up P2 or information recording motion. In this connection, considering the increase of the speed of the random access or the easiness of the detection processing, which will be described later, it is preferable that the detector 1 is arranged at the same radial position as the pick-up P2. The detector 1 arranged at such the position, conducts the motion to detect the foreign material on the surface of the information recording medium before the pick-up P2 successively reads out the recording information from the information recording surface of the optical disk by the method which will be described later, and supplies the light detection signal corresponding to the height of the detected foreign material to the delay circuit 2.

The delay circuit 2 delays the supplied light detection signal for a predetermined time after the foreign material is detected, that is, for a time period corresponding to a time required until the foreign material reaches the slider 5 from the time point at which the foreign material is detected by the detector 1, and generates a delay detection signal, and supplies the delay detection signal to the control circuit 3.

The control circuit 3 generates the control current which is a control signal corresponding to the amplitude of the delay detection signal supplied from the delay circuit 2, and appropriately supplies to the coil 4 of the magnetic circuit, thereby, the control circuit 3 generates the magnetic field corresponding to the amplitude of the control current in the coil 4. In this connection, the control current is flowed in the direction in which the coil 4 generates the magnetic field to give the repulsive force to the slider 5 as the magnetic substance.

The control current can be obtained, for example, according to the relational expression shown below. That is, when the intensity of the magnet pole possessed by the slider 5 is m [wb], the spring constant of the support member 108 to elastically support the slider is k, the height of the detected foreign material is x, and the number of turns of the coil 4 is n, then, the control current I may be the current value satisfying the condition of $$I > 2kx/(m \cdot n).$$

The coil 4 generates the magnetic repulsive force between the magnetic field and the magnetic pole of the bottom surface portion of the slider by giving the magnetic field generated by the control current to the slider 5 just above, and before the foreign material reaches the position of the slider 5, moves the slider 5 supported by the high elastic support member 108 in the direction to separate it from the information reading surface together with the SIL 106. Thereby, the slider 5 and the SIL 106 can be prevented from carelessly clashing against foreign material.

The optical head apparatus is structured as described above, and because, when the pick-up P2 successively reads out the recording information of the rotating optical disk, the detector 1 detects the existence of the foreign material on the recording information surface at which the recording information positions, and the height of the foreign material when it exists, preceding to the reading out of the recording information by the pick-up 2, and corresponding to the detection result, the movement unit conducts the movement motion to separate the floating slider 5 and SIL 106 from the information recording medium surface to the higher position than the height of the foreign material, thereby, the slider 5 and the SIL 106 can be prevented from clashing against the foreign material.

Figure 2:
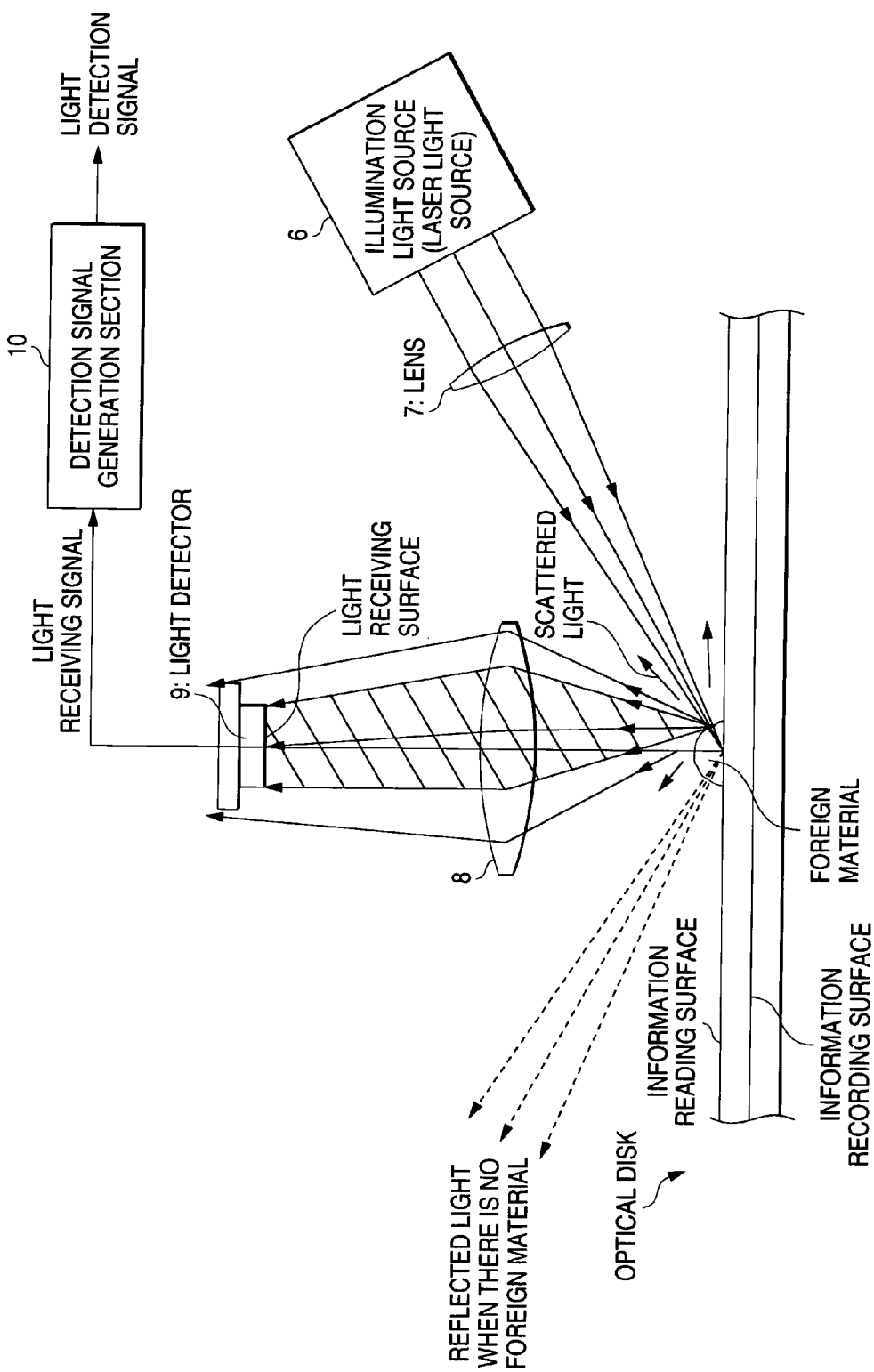
FIG. 2 is a view showing an example of the structure of a detector.

Next, a specific structural example of the detector 1 will be described. FIG. 2 is a view showing an example of the structure of the detector 1. In FIG. 2, the detector 1 is structured by comprising a laser light source 6 as the illumination light source, lens 7, lens 8, light detector 9, and detection signal generation section 10.

The laser light source 6 irradiates the laser light at a predetermined incident angle onto the information recording surface of the optical disk. The lens 7 is arranged between the laser light source 6 and the information recording surface, and converges the laser light from the laser light source 6 onto the information recording surface of the rotating optical disk. The light converging position is positioned at the upstream side from the recording information reading position of the pick-up P2 in the rotational direction of the optical disk by a predetermined distance.

The detector 1 is moved and controlled in the disk radial direction by the movement controller, not shown, so that the predetermined positional relationship is kept to the casing 100 of the pick-up P2. Accordingly, when the pick-up 2 is transferred in the disk radial direction by the carriage 110, the light converging position on the information recording surface by the laser light from the laser light source 6 is also moved accompanying the movement of the casing 100 of the pick-up P2.

The lens 8 is arranged on the almost perpendicular direction (the normal line direction to the recording medium surface) from the light converging position on the information recording surface, and the optical path is formed so that, when the light is incident from the information recording surface in the vicinity of the light converging position, a portion of it is light converged and guided onto the light receiving surface of the light detector 9.

The laser light converged onto the light converging position on the information recording surface through the lens 7 from the laser light source 6 is, when there is no foreign material such as dust on the light converging position or protrusions due to the molding failure on the information reading surface, reflected at almost the same reflection angle as the incident angle at the light converging position, and forms the reflected light along the reflection light path shown by a dotted line in FIG. 2. As shown in FIG. 2, because the lens 8 and light detector 9 are positioned out of the reflected light by the reflection light path, the light detector 9 does not receive the reflected light. Accordingly, in this case, the detection signal is not outputted from the light detector 9.

On the one hand, when there is the foreign material such as the dust or protrusions due to the molding failure at the light converging position on the information recording surface, because the light irradiates on the foreign material, the scattered light from the foreign material is generated. This scattered light scatters almost uniformly in the space on the information recording surface around the foreign material with the intensity of the light almost proportional to the height of the foreign material, and a portion of it is incident on the lens 8. The scattered light incident on the lens 8 (oblique line portion in FIG. 2) is converged by the lens 8 and introduced to the light receiving surface of the light detector 9. Thereby, the light detector 9 outputs the light receiving signal proportional to the intensity of the received scattered light, that is, the light receiving signal almost proportional to the height of the foreign material.

The light detector 9 detects the light introduced onto the light receiving surface by the lens 8, and supplies the light receiving signal proportional to the intensity of the received light to the detection signal generation section 10.

The detection signal generation section 10 calculates the data value corresponding to a peak value of the light detection signal obtained by amplifying the light receiving signal supplied from the light detector 9 by a predetermined gain value. Then, the calculated data value is compared to the previously stored reference value, and only when the data value is larger than the reference value, the data value is outputted to the delay circuit 2.

Herein, the reference value is a data value corresponding to the peak value of the light detection signal obtained by amplifying the scattered light from the foreign material of the height which is slightly smaller than the floating height h of the SIL 106 by the predetermined gain value in the detection signal generation section 10.

Accordingly, when there is no foreign material, or, of course, also in the case where there is the foreign material, when it is judged that the height of the foreign material is lower than the floating height h of the SIL 106, the light detection signal is not outputted.

That is, only when it is judged that the height of the foreign material is higher than the floating height h of the SIL 106, the light detection signal corresponding to the foreign material is supplied to the delay circuit 2.

Next, the operation of the control circuit 3 which is a controller when the detector 1 detects the foreign material on the optical disk surface, will be described.

When the detector 1 detects the foreign material higher than the floating height h of the currently floating slider 5 at the light converging position, and supplies the light detection signal of the amplitude corresponding to the height of the foreign material to the delay circuit 2 of the movement unit, the delay circuit 2 conducts the delay processing on the supplied light detection signal and generates the delay signal, and supplies this to the control circuit 3.

The control circuit 3 generates the control current of the amplitude corresponding to the amplitude of the supplied delay signal, and supplies it to the coil 4. The coil 4 generates the repulsive magnetic field to the magnet pole surface on the bottom surface portion side of the slider 5 corresponding to the supplied control current, and by giving it to the floating slider 5, gives the repulsive force corresponding to the amplitude of the control current to the slider 5.

The SIL 106 which is floating with the floating height h from the information recording surface under the elastically supported condition by the support member 108, receives the repulsive force, and is pushed upward along the optical axis direction of the objective lens 103 together with the slider 5 by the distance corresponding to the repulsive force, and is moved to the higher position than the height of the foreign material from the information reading surface.

In this connection, the control circuit 3 applies the control current to the coil 4 according to the delay detection signal in which the detection signal of the foreign material outputted from the detector 1 is delayed by the delay circuit 2 by a predetermined time. Accordingly, in the case where the predetermined time is set to a shorter time by a time necessary for the slider to move to a predetermined height by the application of the repulsive force, than a time in which the foreign material reaches the position of the slider 5 and the SIL 106 after the detector 1 detects the foreign material on the disk surface, when the foreign material reaches on the information reading point of the pick-up, the slider 5 has been surely moved to the position of the height higher than the height of the foreign material.

As the result, the SIL 106 and the slider 5 which are floating on the information reading surface, can be prevented from carelessly clashing against the foreign material.

Figure 3:
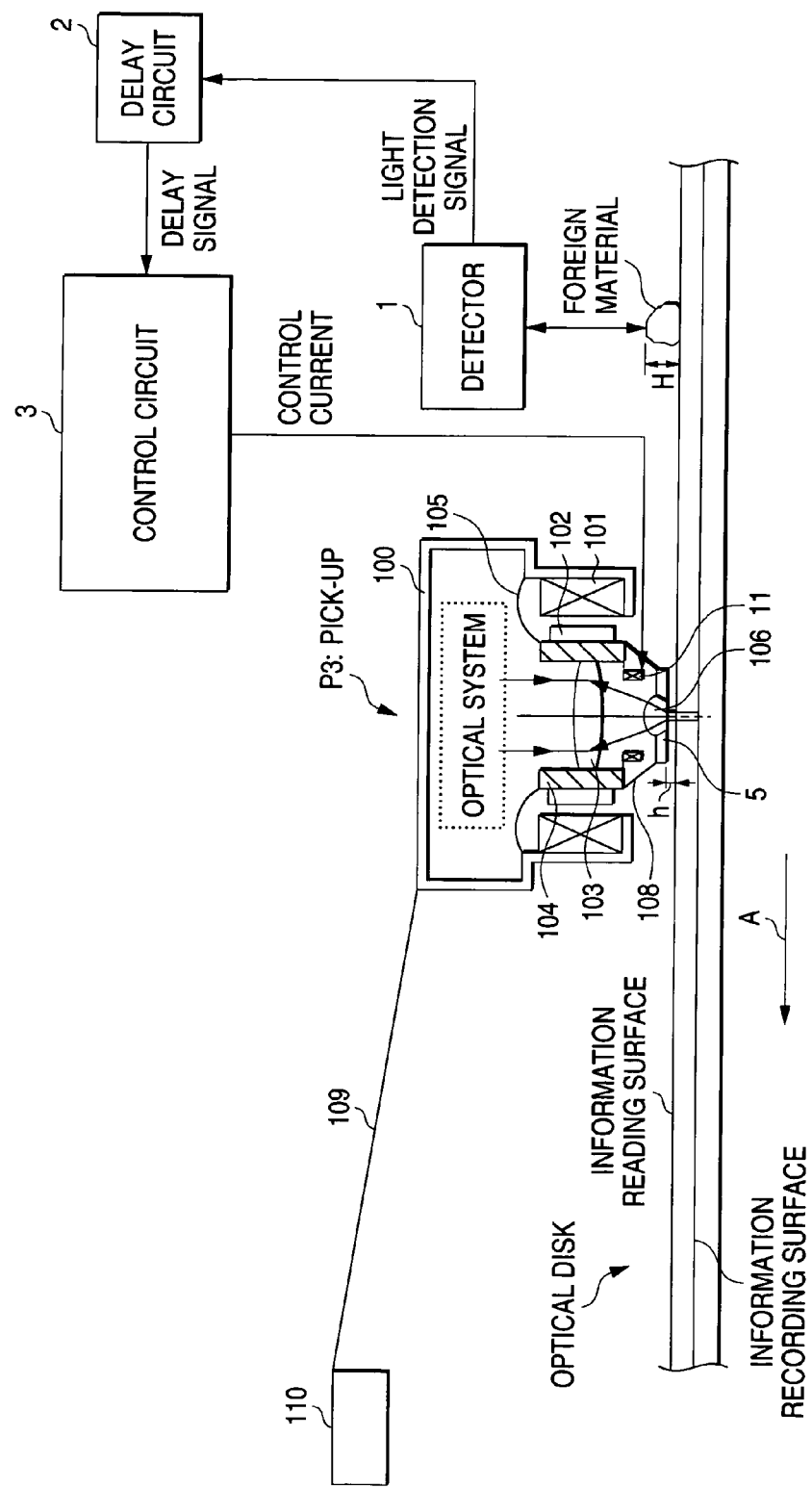
FIG. 3 is a view showing the optical head apparatus of another embodiment in the present invention.

In this connection, the coil as the magnetic field generator, may be arranged just above the slider 5, for example, in the same manner as the pick-up P3 of the optical head apparatus shown in FIG. 3.

FIG. 3 is a view showing the optical head apparatus of another embodiment in the present invention. The optical head apparatus in FIG. 3 is structured by replacing the pick-up P2 in the optical head apparatus in FIG. 1, with the pick-up P3. Further, the pick-up P3 is structured being provided with a coil 11 as the magnetic field generator in place of the coil 4 in the pick-up P2.

The coil 11 is the solenoid type electromagnet on which the copper wires are cylindrically wound in the same manner as the coil 4, and is fixed on a position just above the slider 5, for example, on the lens holder 104, and arranged so that the circular cross section of the solenoid is coaxial with the optical axis of the objective lens 103. Accordingly, the relative position of the coil 11 to the lens holder 104 supported by the casing 100 of the pick-up P3 through the support member 105 is fixed, and when the pick-up P3 is appropriately moved in the radial direction of the disk by the carriage 110, the coil 11 is provided so that it can be moved together with the lens holder 104, and arranged always just above the slider 5.

The coil 11, in the same manner as the coil 4 of the pick-up P2, generates the magnetic field corresponding to the amplitude of the control current supplied from the control circuit 3 and generates the attraction magnetic field to the magnet pole surface on the upper surface side of the slider 5, and by providing it to the slider 5 which is floating, gives the attraction force corresponding to the amplitude of the control current to the slider 5.

As the result, the SIL 106 which is floating at the floating height h from the information recording surface under the condition it is elastically supported by the support member 108, receives the magnetic attraction force, and is attracted to the upper coil 11 along the optical axis direction of the objective lens 103 together with the slider 5, and is moved to the higher position than the height of the foreign material from the information reading surface.

In this connection, in FIG. 3, an example in which the slider 5 holding the immersion lens 106 is indirectly supported by the carriage 110 through the lens holder 104 and the pick-up casing 100, is shown, however, the structure in which a suspension arm, not shown, is connected to the carriage 110, and through the suspension arm, the slider 5 holding the immersion lens is directly supported, may also be allowable.

Figure 4:
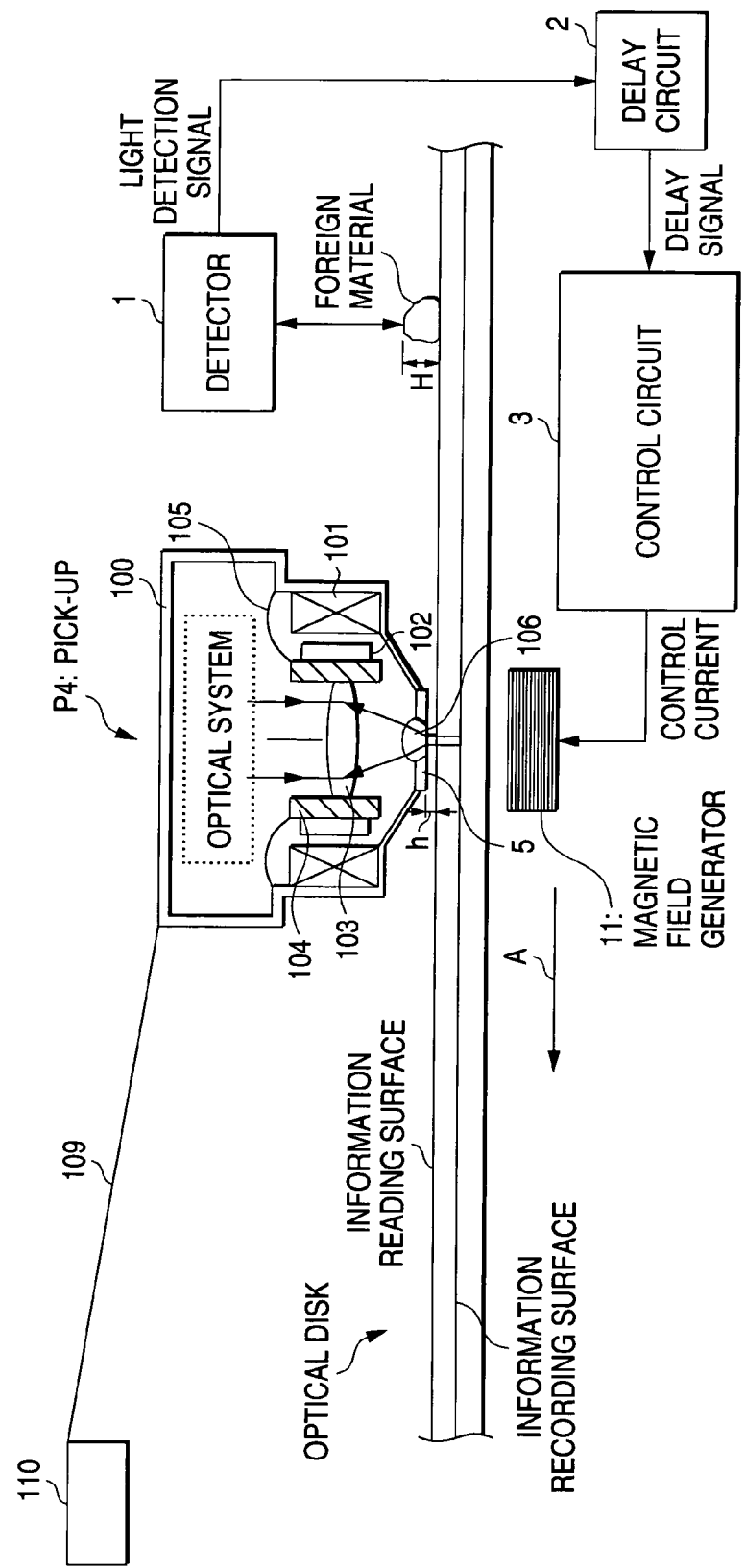
FIG. 4 is a view showing an example of the structure of another pick-up of the optical head apparatus.

Further, in each of the embodiments, the pick-up having the structure in which the slider 5 fixedly holding the SIL 106 is elastically supported on the lens holder 104 by the support member 108, is described, however, the pick-up of the optical head apparatus in the present invention is not limited to this structure, but, for example, as shown in FIG. 4, it may be directly fixed onto the casing 100 of the pick-up.

FIG. 4 is a view showing an example of the structure of another pick-up of the optical head apparatus, and a pick-up P4 of the structure in which the repulsive magnetic field is provided onto the SIL 106 fixed onto the casing 100 by the coil 11 arranged just below the SIL 106 sandwiching the optical disk in the same manner as the pick-up P2, is shown. In this case, the whole body of the pick-up P4 including the slider 5 elastically supported by the support member 109 is moved in the height direction (in the direction of the normal line of the recording surface) by the repulsive magnetic field generated corresponding to the control current supplied from the control circuit 3. As the result, the slider 5 and the SIL 106 can be separated from the foreign material.

As described above, according to invention of the first aspect, the detector detects the height of the foreign material on the information reading surface of the recording medium, and the controller supplies the control signal to separate the pick-up from the information recording medium by the movement unit to the movement unit corresponding to the detection result. Then, because the movement unit moves the pick-up in the direction to separate the pick-up from the information recording medium according to the supplied control signal, the pick-up can be prevented from clashing against the foreign material.

Further, according to the invention of the second aspect, in the case where the detector detects the foreign material of the height higher than the floating height h of the immersion lens, when the movement unit supplies the current to make, for example, the magnetic field generator composed of the electromagnet generate the magnetic force corresponding to the height of the foreign material to the magnet integrally provided with the immersion lens, because the immersion lens can be moved to the higher position than the height of the foreign material in the direction to separate the immersion lens from the information recording surface, the immersion lens is not carelessly clashed against the foreign material on the surface of the information recording medium.

What is claimed is:

1. An optical head apparatus on an optical path of a light beam between an objective lens and an information recording medium, comprising:
   an immersion lens positioned at a floating height with respect to a surface of the information recording medium;
   a detector that measures a height of a foreign material on a surface of the information recording medium by detecting the intensity of a scattered light in proportion to a height of the foreign material on the information recording medium;
   a controller for outputting a control signal corresponding to the height of the foreign material if the height of the foreign material is higher than the floating height of the immersion lens; and
   a movement unit that moves the immersion lens to a position higher than the height of the foreign material, the movement unit moving the immersion lens by a distance corresponding to the control signal,
   wherein a predetermined time of a delay detection signal necessary for the movement unit to move to a predetermined height is set to a shorter time than a time in which the foreign material reaches the position of the movement unit after the detector detects the foreign material.

2. The optical head apparatus according to claim 1, wherein
   said movement unit includes a magnetic field generator for generating a magnetic field with an intensity corresponding to the control signal, and a magnet integrally provided with said immersion lens, and
   said controller outputs a control signal for the magnetic field generator to generate a magnetic force for moving said immersion lens to the position higher than the height of the foreign material in accordance with the detection result of said detector.

3. The optical head apparatus of claim 1, wherein the detector is arranged at an upstream position of the immersion lens in a rotational direction of the information recording medium.

4. The optical head apparatus of claim 3, wherein the detector is arranged in a same radial position as the immersion lens.

5. The optical head apparatus of claim 1, further provided with an illumination light source that illuminates an incident light beam toward the surface of the information processing medium, wherein the illumination light source is oriented in a manner such that the incident light beam is reflected on the surface of the information recording medium in a first direction when the information recording medium is free from foreign material, and, if a foreign material is disposed on the surface of the information recording medium, the incident light beam is scattered by the foreign material in a second direction toward the detector.

6. The optical head apparatus of claim 5, wherein the detector generates a light detection signal proportional to an amount of incident light that is scattered by the foreign material.

7. The optical head apparatus of claim 1, further provided with a delay circuit that delays the control signal by a predetermined time.

* * * * *